US006970679B2

United States Patent
Blatz et al.

(10) Patent No.: US 6,970,679 B2
(45) Date of Patent: Nov. 29, 2005

(54) METHOD OF DETECTING A REDIRECTION OR RELAYING OF A CONTACTLESS DATA TRANSMISSION USING AT LEAST TWO SEQUENTIALLY DRIVEN TRANSMITTING ANTENNAS

(75) Inventors: Werner Blatz, Leingarten (DE); Helmut Moser, Heilbronn (DE)

(73) Assignee: ATMEL Germany GmbH, Heilbronn (DE)

( * ) Notice: Subject to any disclaimer, the term of this patent is extended or adjusted under 35 U.S.C. 154(b) by 541 days.

(21) Appl. No.: 10/310,567

(22) Filed: Dec. 4, 2002

(65) Prior Publication Data

US 2003/0119453 A1   Jun. 26, 2003

(30) Foreign Application Priority Data

Dec. 5, 2001   (DE) .............................. 101 59 604

(51) Int. Cl.⁷ ............................................... H04B 5/00
(52) U.S. Cl. .................. 455/41.1; 455/11.1; 455/13.3; 455/101; 455/562.1; 455/69; 455/67.16; 455/522; 455/345; 455/343.5; 340/539.1; 340/539.13; 340/10.41; 340/5.72; 340/10.4; 340/7.33; 333/1.1; 333/24.2
(58) Field of Search .............................. 455/41.1, 522, 455/11.1, 69, 67.7, 67.13, 345, 343.5, 101, 455/562.1; 340/7.33, 10.4, 5.72, 5.64

(56) References Cited

U.S. PATENT DOCUMENTS

| | | | | |
|---|---|---|---|---|
| 5,532,683 A | * | 7/1996 | Kondo | 340/7.42 |
| 5,790,043 A | * | 8/1998 | Hettich et al. | 340/5.62 |
| 5,850,605 A | * | 12/1998 | Souissi et al. | 455/437 |
| 5,940,003 A | | 8/1999 | Schulz | |
| 5,991,603 A | * | 11/1999 | Aoki et al. | 455/73 |
| 6,002,942 A | * | 12/1999 | Park | 455/522 |
| 6,115,590 A | * | 9/2000 | Tanaka | 455/266 |
| 6,208,239 B1 | | 3/2001 | Mueller et al. | |
| 6,211,776 B1 | | 4/2001 | Roehrl et al. | |
| 6,218,932 B1 | | 4/2001 | Stippler | |
| 6,243,591 B1 | * | 6/2001 | Takemura | 455/522 |
| 6,580,354 B1 | * | 6/2003 | Schweiger et al. | 340/5.62 |
| 6,747,545 B2 | | 6/2004 | Nowottnick et al. | |
| 2001/0014117 A1 | | 8/2001 | Blatz et al. | |
| 2001/0033222 A1 | | 10/2001 | Nowottnick et al. | |
| 2002/0067250 A1 | | 6/2002 | Kamlah | |
| 2002/0109581 A1 | | 8/2002 | Blatz | |
| 2003/0117259 A1 | | 6/2003 | Haas et al. | |

FOREIGN PATENT DOCUMENTS

DE   19718764   8/1998

(Continued)

Primary Examiner—Marceau Milord
(74) Attorney, Agent, or Firm—W. F. Fasse; W. G. Fasse (57) ABSTRACT

A method detects relaying of a contactless data communication by a radio amplifier for intercepting and manipulating the communication to achieve an unauthorized authentication. The method involves transmitting an electromagnetic field successively from at least two spatially separated antennas of a transmitting unit, receiving the transmitted fields in a receiving unit, determining field strength vectors of the received fields allocated to each antenna, and comparing actual values of the vectors with prescribed nominal values stored in a nominal value field that maps the true field strength distribution in multi-dimensional space around the transmitting unit. The actual field strength magnitude and the reception angle between the transmitting antennas can be determined from the vectors and compared with stored nominal values in this manner. When the determined actual values match prescribed nominal values of the nominal value field, the occurrence of a relaying of the signal can be reliably excluded.

24 Claims, 2 Drawing Sheets

FOREIGN PATENT DOCUMENTS

| | | |
|---|---|---|
| DE | 19809433 | 9/1999 |
| DE | 19836957 | 9/1999 |
| DE | 19845649 | 4/2000 |
| DE | 19923409 | 12/2000 |
| DE | 10005503 | 8/2001 |
| DE | 10013542 | 9/2001 |
| DE | 19712911 | 9/2001 |
| DE | 10019277 | 11/2001 |
| DE | 10045776 | 4/2002 |
| DE | 10106736 | 2/2003 |

* cited by examiner

METHOD OF DETECTING A REDIRECTION OR RELAYING OF A CONTACTLESS DATA TRANSMISSION USING AT LEAST TWO SEQUENTIALLY DRIVEN TRANSMITTING ANTENNAS

PRIORITY CLAIM

This application is based on and claims the priority under 35 U.S.C. §119 of German Patent Application 101 59 604.9, filed on Dec. 5, 2001, the entire disclosure of which is incorporated herein by reference.

FIELD OF THE INVENTION

The invention relates to a method for detecting or recognizing the redirection or relaying of a contactless data transmission, especially such a redirection or relaying that is unauthorized.

BACKGROUND INFORMATION

A method of the above mentioned general type is known from the German Patent Laying-Open Document DE 101 06 736 and corresponding U.S. Patent Application Publication 2002-0109581-A1, wherein it is determined whether a redirection or relaying of a contactless data transmission has taken place, by comparing the damping characteristics of the transmission link of the "uplink" and the "downlink" between a first transmitting and receiving unit and a second transmitting and receiving unit. For this purpose, the amplitude value of the transmitted interrogation signal is measured in the second transmitting and receiving unit, and then this value is transmitted back to the first transmitting and receiving unit. Then, in the first transmitting and receiving unit, the value of the amplitude of the interrogation signal that has been transmitted back is compared with the value of the amplitude of the response signal that has been received by the first transmitting and receiving unit. An unacceptable deviation between these two amplitude values in the result of this comparison is an indication that a redirection or relaying of the data transmission has taken place. In actual practice, however, it is a disadvantage that this method does not make it sufficiently difficult to carry out a redirection or relaying using a so-called transceiver, i.e. it remains relatively easy to achieve an undetectable redirection or relaying using such a transceiver.

A further method as background to the present invention is known from the German Patent Laying-Open Document DE 100 05 503 and corresponding U.S. Patent Application Publication 2001-0014117-A 1, wherein at least one physical signal value or characteristic parameter of the transmitted electromagnetic wave is reversibly altered. To achieve this, a reply or response signal is altered relative to the interrogation signal, for example with respect to the frequency, in a second transmitting and receiving unit (i.e. a transponder), and is transmitted back to the first transmitting and receiving unit (i.e. a base station). In the first transmitting and receiving unit (i.e. the base station), the frequency of the response signal is altered or changed back again and compared with the frequency of the originally transmitted interrogation signal. If the frequency value determined in this manner lies within a prescribed interval, then it can be essentially completely excluded that a redirection or relaying has occurred.

Yet another method of the general type forming the background of the present invention is known from the German Patent Laying-Open Publication 100 19 277, in which a redirection or relaying is detected by means of a comparison of the transit time of the interrogation and response signals with prescribed values. In other words, a redirection or relaying is positively detected when the measured value of the transit time does not correspond with a prescribed value of the transit time.

Systems for the contactless transmission of data are preferably used in identification systems. Generally, such systems comprise a first transmitting and receiving unit, i.e. a so-called "base station", and a second transmitting and receiving unit, i.e. a so-called "transponder". These systems are used for authentication in the motor vehicle field, which represents a main field of application. To achieve a high level of security of the authentication, the distance or range over which the communication can take place is limited to just a few meters for a so-called "passive entry" system, i.e. for unlocking the vehicle doors whereupon the vehicle door can be opened by pulling the door handle. Furthermore, methods are being developed to prevent an unauthorized authentication, especially by means of a redirection or relaying of the communication, and for terminating or interrupting the authentication process in the event such a redirection or relaying is detected.

SUMMARY OF THE INVENTION

In view of the above, it is an object of the invention to provide a method for reliably recognizing and detecting the redirection or relaying of the communication signals of a contactless data transmission, for example being used for an authentication. A further object is to increase the difficulty of mimicking the data transmission characteristics and thereby carrying out an undetectable redirection or relaying of the data transmission. The invention further aims to avoid or overcome the disadvantages of the prior art, and to achieve additional advantages, as apparent from the present specification. The attainment of these objects is, however, not a required limitation of the present invention.

The above objects have been achieved according to the invention in a method for detecting a redirection or relaying of a contactless data transmission between a first transmitting and receiving unit and second unit that is at least embodied as a transmitting unit. The first transmitting and receiving unit includes at least two spatially separated antennas. In the method, an electromagnetic signal is transmitted as an electromagnetic field sequentially from the first antenna and then from the second antenna of the first transmitting and receiving unit. The electromagnetic field respectively transmitted by the first antenna and the second antenna of the first transmitting and receiving unit is received by the second unit. The respective actual field strength value of the respective received electromagnetic field that was transmitted by the respective first and second antennas is then determined and compared with prescribed nominal field strength values stored in a value field. If the actual received and measured field strength values are outside of the value range determined by the nominal value field, then a redirection or relaying of the transmission is determined to have occurred.

Throughout this specification, the terms "redirection" and "relaying" are used interchangeably to generally refer to any redirection, relaying, retransmission, repeating, or range-extension of the transmitted data communication, for example via an intermediate device such as a transceiver or radio amplifier relay station, contrary to a direct transmission between the first transmitting and receiving unit and the second (transmitting and) receiving unit without any intervening receiving and/or transmitting device.

The basic underlying point of the invention is to make it considerably more difficult to carry out a redirection or relaying of a contactless data transmission by comparing measured actual values of a received field strength with prescribed nominal field strength values. This is achieved, as mentioned above, by measuring or determining the field strength value of each respective electromagnetic field received by the second unit successively from the respective antennas of the first transmitting and receiving unit, and then comparing the determined field strength values of the respective antenna with respective prescribed nominal values of a value field. A redirection or relaying of the data communication is recognized if the measured actual field strength values unacceptably deviate from the range of values defined by the value field (e.g. the actual values do not match or lie within an acceptable range of any of the nominal values stored in the value field).

A major advantage of the inventive method is that the transmission characteristics of two spatially separated antennas can only be copied or imitated by a redirection or relaying device with great effort, expense and difficulty. Thus, a redirection or relaying of the transmission can be detected with high reliability, because any deviation from the true transmission characteristics of the original transmitting and receiving unit (particularly the true field strength distribution of fields radiated from two or more antennas in two-dimensional or three-dimensional space around the first transmitting and receiving unit) can be detected. In this context, it becomes evermore difficult for the relaying device to imitate the transmission characteristics, the further apart the two or more antennas are spatially separated from each other, and the more the electromagnetic field transmitted from the respective antenna deviates from a perfect spherical signal radiation form. Furthermore, the imitation of the transmission characteristics by the relaying device is additionally made more difficult if more than two spatially separated transmission antennas are used by the transmitting and receiving unit.

In order to avoid a simple superimposing of the respective electromagnetic fields of the respective transmitting antennas of the first transmitting and receiving unit, the respective transmitting antennas are driven successively in a sequential manner for respectively transmitting the electromagnetic field. In this manner, the second receiving unit may sequentially measure or determine the field strength of the electromagnetic field respectively transmitted from each respective one of the antennas of the first transmitting and receiving unit.

In order to quickly and easily carry out the comparison of the field strength values determined by the receiving antenna, it is advantageous to have previously determined or "mapped out" the true electromagnetic field distribution around the respective transmitting antenna for the particular transmitting frequency, dependent on the distance and location relative to the respective antenna. This procedure provides a respective value set (e.g. a value pair) that includes a true field strength of a field of the first antenna and a true field strength of a field of the second antenna at each respective spatial point among plural spatial points distributed throughout the multi-dimensional space around the transmitting and receiving unit. Each value set may further comprise a respective reception angle value of the angle formed between the two antennas from the spatial point to which this respective value set pertains. The resulting plural value sets are stored to form thereof a value field defining a map of the true field strength distribution and reception angles in space around the transmitting and receiving unit. In this con-text, the dimensionality of the value field is dependent on the number of transmitting antennas being used, and is at least two dimensional in the case of using two transmitting antennas.

Moreover, by prescribing minimum and maximum acceptable field strength values within a value field, a permissible value or communication range can be prescribed. In other words, if the actual field strength values later fall outside of the range defined by the minimum and maximum field strength values, then a communication will not be permitted. Furthermore, the functional reliability of the method can be increased, especially in connection with a fluctuation of the damping characteristics, by determining and providing a scattering or variation range around each respective field strength value of the value field. This acceptable range of variation for each field strength value can be selected to form a continuous-coverage map or value field without value gaps between the respective discrete measurements at the finite number of respective discrete spatial points. It is further advantageous that the inventive method is able to detect a redirection or relaying of the electromagnetic field independent of the transmitting frequency, that is to say both in the near or close range field as well as in the far or long range field of the transmitting antenna.

In a further detailed embodiment of the inventive method, the field strength determination of the received electromagnetic field is carried out in the second receiving unit by means of three antennas, which are respectively arranged with their effective axes oriented orthogonally relative to each other. In order to simultaneously determine the individual components of the field strength, that is to say the so-called field strength vector, it is advantageous when each receiving antenna is connected individually to a respective single associated input channel in which the respective component of the field strength vector is determined. In this manner it is possible to suppress the coupling between the individual components, which is caused by a movement or position variation of the antennas during the determination, in connection with a sequential determination of the individual components of the field strength vector. Moreover, with three orthogonally oriented antennas, a space-saving structural configuration can be achieved in that two of the orthogonally oriented antennas are arranged in the plane of the third antenna. This can be achieved especially in the near field of the electromagnetic field, by means of two rod-shaped antennas that are arranged in the plane of the third annular ring-shaped antenna. In other words, the three antennas together form a physical structure with the shape of a cross inside an annular ring.

Investigations by the applicants have shown that it is especially advantageous to detect the redirection or relaying of the electromagnetic signal by determining the magnitude or absolute value of the received field strength from the individual components of the field strength vector respectively for the field transmitted from each respective antenna, and then comparing the value pairs of the absolute magnitudes with the value pairs stored in the value field.

It is further advantageous to determine, from the various field strength vectors, the actual reception angle formed between the two transmitting antennas relative to the receiving unit, and then to compare this determined reception angle with the prescribed or true angle values stored in the value field as mentioned above. In this context, each angular value is, for example, linked or coupled with at least one value pair of the field strength vectors. Insofar as the determined reception angle lies within a prescribed interval or range about the prescribed angle value of a respective value set (or pair) in the value field, then the possibility of a redirection or relaying of the transmission is excluded. On the other hand if the determined reception angle falls outside of the allowable interval or range about the nominal angle value of the value set (or pair) stored in the value field, then the occurrence of a redirection or relaying is detected and indicated. By combining the comparison of the actual values of the field strength vectors, or especially the absolute magnitudes thereof, relative to the respective nominal values therefor stored in the value field, and the comparison of the actual determined value of the reception angle relative to the angle values stored in the value field, the reliability of the method is increased.

According to another detailed embodiment of the invention it is advantageous that the results of the value comparisons are stored, so that the stored values can thereafter be used, for example, to determine the scattering or variation ranges of the field strength determination. Particularly, by means of the stored values, it is possible to obtain statistical information regarding a long term or slowly occurring variation of the transmitting and/or receiving characteristics. In connection with the inventive method being carried out in a device in a motor vehicle, the stored information can be read-out at regular intervals, for example, during the normal service intervals of the motor vehicle.

In a further developed embodiment of the invention the magnetic portion of the field strength is determined for a communication in the electromagnetic near field. It is particularly advantageous that the reception of the signal can be carried out by means of especially space-spacing inductive antennas. In this context, it must be considered that the magnetic field of transmitting antennas arranged internally in a motor vehicle is strongly deformed in the exterior space outside of the vehicle, due to the effects of the sheet metal body of the vehicle, especially for low frequency transmission signals in the range of 125 kHz. Therefore, a copying or imitation of the transmission characteristics of such antennas cannot be achieved with an acceptable or practical effort and expense, so that a redirection or relaying of the signal can be detected with great reliability.

It is further advantageous to carry out the value comparison at or before the beginning of the data transmission, and to then begin the actual data transmission when no redirection or relaying of the signal has been detected. It is further advantageous to carry out the value comparison repeatedly during the data transmission, so as to thereby increase the security of long term data transmission. Investigations by the applicants have shown that it is advantageous especially in connection with relatively large data quantities, to carry out the determination of the field strength on modulated data-carrying electromagnetic fields. In this context, the electromagnetic field is modulated, preferably by a phase or frequency modulation, and the determination of the received field strength and the comparison of the field strength values is, for example, carried out during an identification routine that is based on the modulated electromagnetic field. Insofar as or whenever no redirection or relaying of the signal is detected, the data received and evaluated during the field strength comparison are deemed valid. On the other hand, whenever a redirection or relaying is detected, the data received during the associated field strength comparison are deemed invalid and lead to a failure of the identification process.

In yet another embodiment of the invention, especially in connection with a unidirectional data transmission, it is advantageous to carry out the value comparison within the receiver. In this regard, the nominal value field is stored in a memory unit in the receiver itself. In this manner, it is not necessary to transmit the received field strength values back to the first transmitting and receiving unit, so that thereby the total communication time is reduced. On the other hand, another embodiment of the inventive method relates especially to a bi-directional data transmission, in which it is advantageous that the field strength values and/or the result of the comparison of the field strength values are transmitted by the second unit (embodied as a receiving and transmitting unit) back to the first transmitting and receiving unit. The nominal value field may be stored in the first unit. In this manner, the determination and/or the comparison of the received field strength values can be carried out in the first transmitting and receiving unit, rather than in the second unit, whereby the circuit complexity and the power consumption of the second unit are reduced.

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
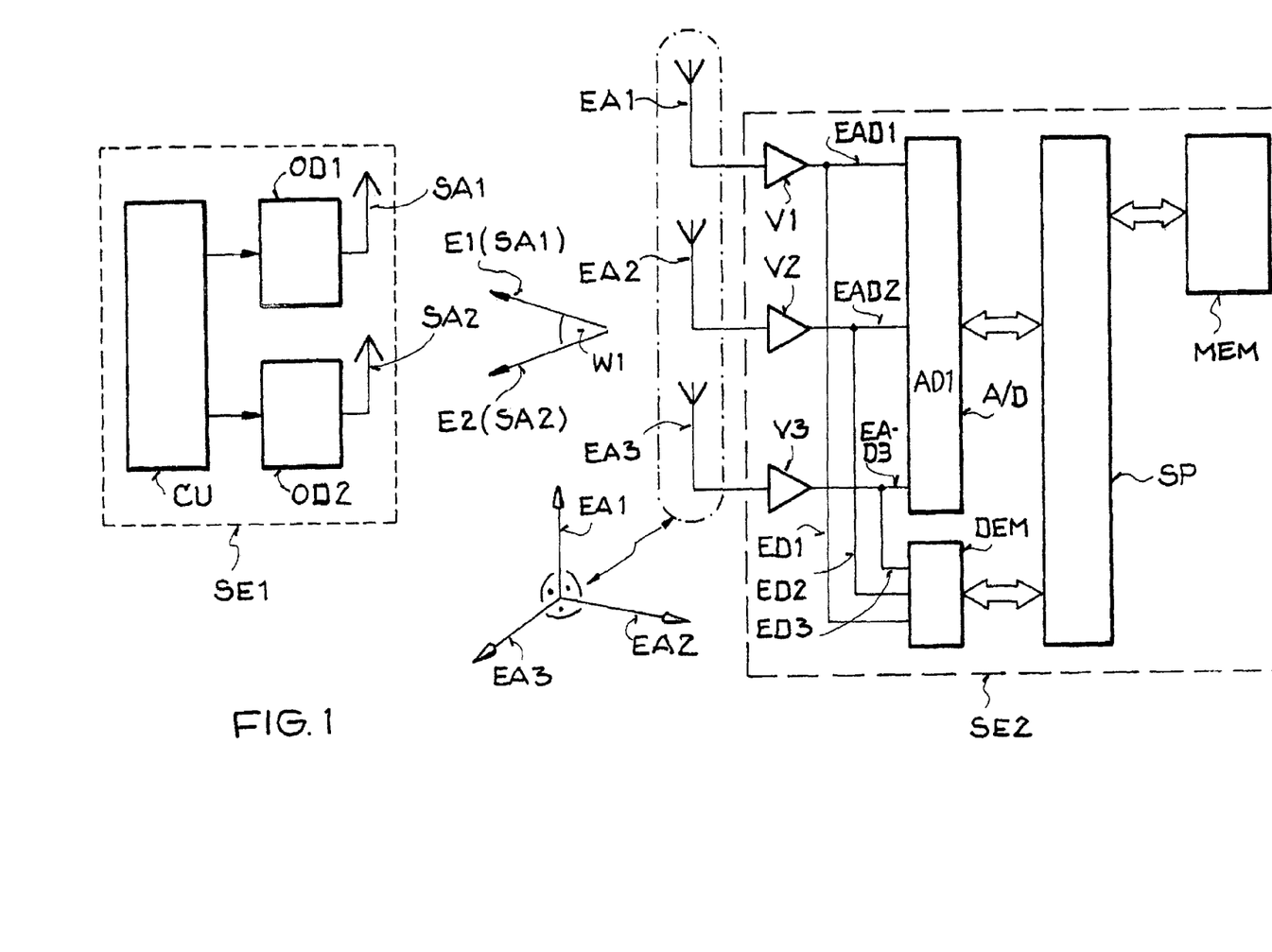
FIG. 1 is a schematic block diagram of an example embodiment of an arrangement for carrying out the inventive method, with a first transmitting and receiving unit having two spatially separated antennas, and a second receiving unit.

Generally as shown schematically in FIG. 1, an exemplary arrangement according to the invention, for carrying out the inventive method, includes a first unit SE1 embodied as a first transmitting and receiving unit SE1, and second unit SE2 embodied as a second receiving unit SE2. The purpose or function of this arrangement is to carry out a data exchange or communication by transmitting a data-carrying modulated electromagnetic field between the first transmitting and receiving unit SE1 and the second receiving unit SE2, and during this data communication, to detect any redirection or relaying of the electromagnetic field (e.g. via a relay transceiver rather than directly from the first unit SE1 to the second unit SE2) by comparing actual received field strength values determined in the second receiving unit SE2 with prescribed nominal field strength values.

Next, the physical components or structural features of the illustrated arrangement will be described in further detail. The first transmitting and receiving unit SE1 comprises a control unit CU, which is respectively connected to a first output driver OD1 and to a second output driver OD2. A first transmitting antenna SA1 is connected with the first output driver OD1, and a second transmitting antenna SA2 is connected with the second output driver OD2.

The second receiving unit SE2 comprises three antennas EA1, EA2 and EA3 that are respectively oriented orthogonally relative to each other. A respective individual input channel is allocated and connected to each respective one of the receiving antennas EA1, EA2 and EA3, in that the respective receiving antennas EA1, EA2 and EA3 are respectively connected by a respective signal amplifier V1, V2 and V3 to an input EAD1, EAD2 and EAD3 of an A/D converter AD1. Furthermore, each input EAD1, EAD2 and EAD3 of the A/D converter AD1 is respectively connected with a respective associated input ED1, ED2 and ED3 of a demodulator DEM. In this manner, the signal received by each one of the receiving antennas EA1, EA2 and EA3 can be individually demodulated to obtain and evaluate the data being carried by the modulated signal as received by each of the receiving antennas. The A/D converter AD1 and the demodulator DEM are also each respectively connected with a signal processor SP, which in turn is further connected with a memory unit MEM.

In the following, the functional operation of the arrangement will be explained in further detail. The first transmitting and receiving unit SE1 transmits an electromagnetic signal as an electromagnetic field E1(SA1) by means of the first transmitting antenna SA1, and then (sequentially thereafter), transmits an electromagnetic field E2(SA2) by means of the second transmitting antenna SA2. In this context, the respective electromagnetic fields E1(SA1) and E2(SA2) transmitted by the first transmitting antenna SA1 and by the second transmitting antenna SA2 are preferably the same electromagnetic field in succession or with a time delay being transmitted first via the first transmitting antenna SA1 and thereafter via the second transmitting antenna SA2 so as to avoid a simultaneous overlap of the two fields. More generally, the amplitude of the electromagnetic field E1(SA1) transmitted via the first transmitting antenna SA1 preferably corresponds to the amplitude of the electromagnetic field E2(SA2) transmitted via the second transmitting antenna SA2.

Next, by means of the three receiving antennas EA1, EA2 and EA3 of the second receiving unit SE2, the respective three orthogonal components of the field strength of the field E1(SA1) received from the first transmitting antenna SA1 are determined. Namely, the three individual components of the field strength vector E1 are processed individually in the three respective input channels in that they are respectively individually converted into digital signals in the A/D converter AD1 and the corresponding digital signals are provided to the signal processor SP. Thereafter, in a similar manner, the three respective components of the field strength vector E2 of the electromagnetic field E2(SA2) as received by the three receiving antennas EA1, EA2 and EA3 from the second transmitting antenna SA2 are digitized through the A/D converter AD1 and provided to and processed in the signal processor SP. Particularly, the signal processor SP compares the two magnitude values of the field strength vectors E1 and E2 with the respective value pairs that have been stored in a value field in the memory unit MEM. Furthermore, the signal processor SP calculates a reception angle W1 from the two field strength vectors E1 and E2 and compares this reception angle W1 with respective nominal values for the reception angle stored in the memory unit MEM. This reception angle W1 represents the angle between the two transmitting antennas SA1 and SA2 from the angle vertex or reference point of the second receiving unit SE2.

If both the field strength values as well as the value of the reception angle W1 correspond with the respective appropriate values of a given value pair or value set prescribed by, i.e. stored in, the memory unit MEM, then it is assumed that no redirection or relaying of the electromagnetic signal has taken place, i.e. no redirection or relaying is detected. As a result, the data that have been demodulated and obtained by the demodulator DEM are accepted as valid and are further processed in the signal processor SP. The signal processor SP, as well as the other circuit components, may comprise any combination of conventionally known hardware and software for carrying out the functions and process steps as described herein. The processing of the received data in the signal processor SP may, for example, involve an authentication or identification process to authenticate and authorize carrying out and acting on the data communication.

An advantage of the inventive method is that an unauthorized extending of the communication path or link via a relay transceiver or the like can be detected in a reliable manner through determining the respective field strength vectors by obtaining the field strength of the electromagnetic fields respectively transmitted by the two or more transmitting antennas. Furthermore, the minimum and maximum allowable distance for a valid communication between the first transmitting and receiving unit SE1 and the second receiving unit SE2 can be prescribed by imposing maximum and minimum field strength values on the value pairs stored in the value field in the memory unit MEM. The security against a redirection or relaying can be further increased by repeatedly determining the field strength during a communication period, and/or by utilizing more than two transmitting antennas for the first transmitting and receiving unit SE1.

A further advantage of the inventive method is that a simple location-dependent determination of the true field strength distribution of the electromagnetic field about the respective transmitting antenna makes it possible to determine the value field for a given transmitting and receiving arrangement. Namely, the corresponding value tuple or related value set as well as the reception angle are respectively stored in the value field respectively for plural points in space about the transmitting and receiving unit. The number of the points in space is selected for the desired degree of precision. In order to increase the reliability of the comparison of the actual measured values with the prescribed nominal values, the respective value pairs and the reception angle values are each associated with an acceptable scattering or variation range. In this context, the magnitude of the scattering or variation range depends on the deformation of the field distribution, and on the system transmission scattering characteristics of the transmitting and receiving arrangement, and on the spatial precision, i.e. the number of spatial points and associated value tuples that have been determined and stored in the value field.

It is impossible to copy or imitate the overall transmission characteristic using a relaying device with an acceptable or practical effort and expense, even if the spacing distance between the transmitting antennas lies within the allowable communication range or distance, for example in an application in a motor vehicle. Furthermore, the inventive method may be carried out in connection with both a unidirectional communication as well as a bi-directional communication. Especially in a bi-directional communication between the two units SE1 and SE2, the determination of the field strength vectors can be carried out in the first transmitting and receiving unit SE1, in that the individual components of the respective received field strength vector are transmitted back from the second unit SE2 to the first transmitting and receiving unit SE1. In this context, of course, the second unit SE2 must also be embodied as a transmitting and receiving unit having both receiving and transmitting capabilities. In this manner, the circuit complexity as well as the power consumption of the second transmitting and receiving unit can be considerably reduced, because the evaluation and processing of the received field strength information does not need to be carried out directly in the second unit. Furthermore, since the determination and the comparison of the field strength values can be carried out directly during the data evaluation within an authentication process, the total communication time is only slightly increased.

Figure 2:
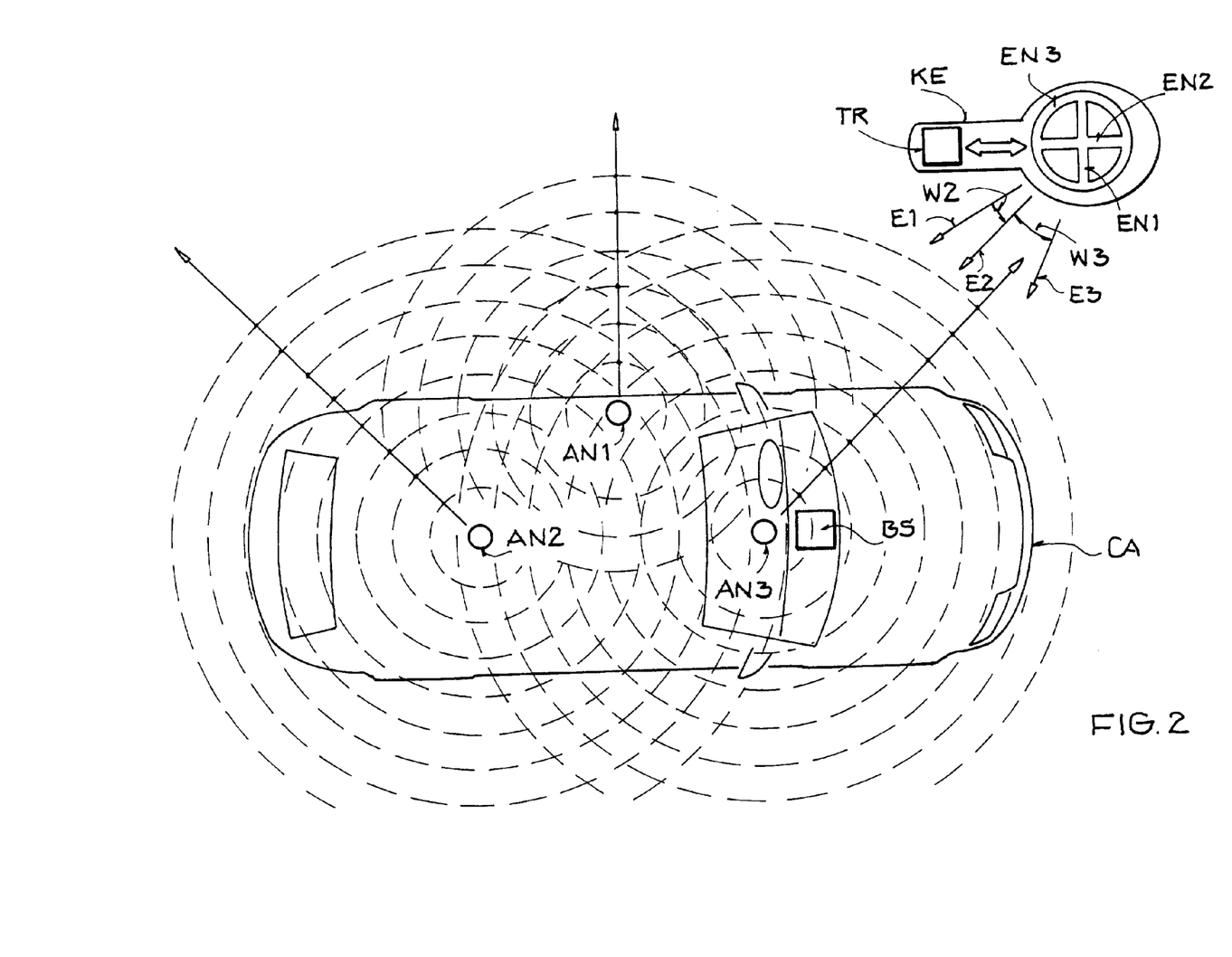
FIG. 2 is a schematic diagram of another example embodiment of an arrangement for carrying out the inventive method, including a first transmitting and receiving unit having three spatially separated antennas arranged in a motor vehicle, and a second receiving unit having an especially compact arrangement of three receiving antennas.

FIG. 2 schematically shows a second example embodiment in which the first transmitting and receiving unit (not shown in detail) is embodied as a base station BS that is installed in a motor vehicle CA. The base station BS is respectively connected to three transmitting and receiving antennas AN1, AN2 and AN3 arranged spatially separated from each other in or on the motor vehicle CA. The second transmitting and receiving unit (not shown in detail) is embodied as a transponder TR that is installed or integrated in a key fob or key KE, for example a key for unlocking and operating the motor vehicle CA. The transponder TR comprises or is connected to three transmitting and receiving antennas EN1, EN2 and EN3. The antenna EN3 is embodied as an annular ring-shaped antenna EN3. The two antennas EN1 and EN2 are embodied as rod-shaped antennas EN1 and EN2 arranged preferably crossing one another in the plane of the annular ring-shaped antenna EN3. In this manner, the effective axes of these three antennas EN1, EN2 and EN3 are oriented orthogonally relative to each other, while all three antennas are physically arranged lying in a single plane.

A bidirectional data transmission is to be carried out between the base station BS and the transponder TR in the low frequency range at 125 kHz by means of an inductive coupling in the electromagnetic near field. To carry out the authentication and data communication process, the base station BS radiates or transmits the electromagnetic field sequentially in succession from the three transmitting and receiving antennas AN1, AN2 and AN3. Since, for an effective communication, the transmitting and receiving antennas EN1, EN2 and EN3 of the transponder TR are located in the near field of the transmitting antennas AN1, AN2 and AN3, essentially the magnetic components of the electromagnetic field are effective. In this context, generally the magnetic field shape or field progression outside of the motor vehicle CA deviates from a spherical field form, because it is deformed proportionally with the magnitude of the permeability of the body of the motor vehicle CA at any location.

In the transponder TR, by means of the transmitting and receiving antennas EN1, EN2 and EN3, the orthogonal components of the field strength vectors E1, E2 and E3 respectively associated with the transmitting antennas AN1, AN2, and AN3 are received and determined in sequential succession. In this context, beginning with the transmission of the field by the first antenna AN1 of the base station BS, the associated three components of the magnetic field strength vector E1 are determined, e.g. measured, in the transponder TR and then the individual components are transmitted back from the transponder TR to the base station BS. Then, this same process is carried out for the respective components of the field strength vector E2 associated with the second antenna AN2, and then for the field strength vector E3 associated with the third antenna AN3.

Preferably, in the context of the transmission of the values of the individual components back to the base station BS from the transponder TR, the values are preferably modulated by the transponder TR onto a reply or response signal as digital data in an encoded form. In the base station BS, the respective associated magnitudes or absolute values as well as the reception angle W2 between the vectors EN1 and EN2, and the reception angle W3 between the vectors EN2 and EN3, are determined from the components of the respective vectors EN1, EN2 and EN3, and are then compared with the respective associated values of value sets or tuples stored in a value field. Furthermore, it is advantageous according to the invention, that if the determined actual values correspond with the stored nominal values, then the base station BS transmits a corresponding reply or response signal to the transponder TR to inform the transponder TR of the validity of the evaluated data, in order to further carry on the authentication process between the base station BS and the transponder TR.

An advantage of the inventive method, in connection with a bi-directional data transmission, is that the determination of the vectors and the comparison of the determined actual values with the prescribed nominal values can respectively be carried out in the base station BS. This allows the complexity of an integrated circuit of the transponder TR as well as the power consumption of the transponder TR to be reduced, which is beneficial when the transponder TR is to be embodied in a small key KE or the like.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of detecting a relaying of a contactless electromagnetic data transmission, comprising the steps:
   a) transmitting a first electromagnetic field from a first transmitting antenna of a first unit having at least a transmitting capability;
   b) sequentially after said step a), transmitting a second electromagnetic field from a second transmitting antenna of said first unit, wherein said first and second transmitting antennas are spatially separated from each other;
   c) sequentially receiving said first electromagnetic field and said second electromagnetic field with a second unit having at least a receiving capability;
   d) determining a first actual field strength value of a field strength of said first electromagnetic field and a second actual field strength value of a field strength of said second electromagnetic field as respectively received by said second unit;
   e) comparing said first and second actual field strength values respectively with prescribed first and second nominal field strength values of a nominal value field; and
   f) detecting that a relaying of at least one of said first and second electromagnetic fields has occurred if said comparing determines that said first and second actual field strength values unacceptably deviate from said prescribed first and second nominal field strength values of said nominal value field.

2. The method according to claim 1, wherein said first and second electromagnetic fields as transmitted respectively by said first and second transmitting antennas both have the same amplitude.

3. The method according to claim 1, wherein said first and second electromagnetic fields as transmitted respectively by said first and second transmitting antennas both correspond to the same electromagnetic signal transmitted successively from said first transmitting antenna and then again from said second transmitting antenna.

4. The method according to claim 1, further comprising comparing said first and second actual field strength values with a prescribed maximum value and with a prescribed minimum value, and detecting that a relaying of at least one of said first and second electromagnetic fields has occurred if at least one of said first and second actual field strength values lies above said maximum value or below said minimum value.

5. The method according to claim 1, wherein said comparing of said step e) comprises determining whether said first and second actual field strength values respectively fall within a prescribed acceptable variation range respectively around said first and second nominal field strength values, and if at least one of said first and second actual field strength values falls outside of said prescribed acceptable variation range respectively around said first and second nominal field strength values then it is determined that said first and second actual field strength values unacceptably deviate from said prescribed first and second nominal field strength values.

6. The method according to claim 1, wherein said nominal value field includes a plurality of value sets that each respectively include a respective one of said first nominal field strength values and a respective one of said second nominal field strength values which are prescribed for a respective spatial point in multi-dimensional space around said first unit, and wherein said comparing of said step e) comprises determining whether said first and second actual field strength values respectively match or fall acceptably close to said first and second nominal field strength values of any one of said value sets.

7. The method according to claim 6, further comprising a preliminary step of mapping out a field strength distribution pattern of said first electromagnetic field transmitted by said first transmitting antenna and of said second electromagnetic field transmitted by said second transmitting antenna in said multi-dimensional space around said first unit, by transmitting said first and second electromagnetic fields successively from said first and second transmitting antennas respectively, measuring a respective first true field strength value of said first electromagnetic field and a respective second true field strength value of said second electromagnetic field respectively at each one of plural spatial points in said multi-dimensional space around said first unit, and respectively storing said first and second true field strength values as said first and second nominal field strength values of a respective one of said value sets respectively for each respective one of said spatial points in said multi-dimensional space around said first unit to make up said nominal value field.

8. The method according to claim 6,
wherein each respective one of said value sets respectively further includes a respective nominal reception angle value of an angle between said first and second transmitting antennas with respect to a respective angle vertex at said respective spatial point associated with said respective value set;
wherein said method further comprises determining from said first and second electromagnetic fields received by said second unit an actual reception angle value of a reception angle between said first and second transmitting antennas relative to said second unit, and comparing said actual reception angle value with said nominal reception angle values of said value sets; and
wherein said step f) comprises detecting that a relaying of at least one of said first and second electromagnetic signals has occurred if said first and second actual field strength values do not respectively match or fall acceptably close to said first and second nominal field strength values or said actual reception angle value does not match or fall acceptably close to said respective nominal reception angle value of any single one of said value sets.

9. The method according to claim 1, wherein said step c) comprises respectively receiving three mutually orthogonal field strength components of a first field vector of said first electromagnetic field and of a second field vector of said second electromagnetic field, and said step d) comprises determining said first actual field strength value as an absolute magnitude of said first electromagnetic field from said orthogonal field strength components of said first field vector of said first electromagnetic field and determining said second actual field strength value as an absolute magnitude of said second electromagnetic field from said orthogonal field strength components of said second field vector of said second electromagnetic field.

10. The method according to claim 9, further comprising determining a reception angle between said first and second transmitting antennas relative to said second unit from said field vectors of said first and second electromagnetic fields.

11. The method according to claim 1, further comprising transmitting a third electromagnetic field from a third transmitting antenna of said first unit which is spatially separated from said first and second transmitting antennas sequentially after said step b), receiving said third electromagnetic field with said second unit, determining a third actual field strength value of a field strength of said third electromagnetic field as received by said second unit, comparing said third actual field strength value with prescribed third nominal field strength values of said nominal value field, and detecting that a relaying of at least one of said first, second and third electromagnetic fields has occurred if said comparing determines that at least one of said first, second and third actual field strength values unacceptably deviates respectively from said prescribed first, second and third nominal field strength values of said nominal value field.

12. The method according to claim 1, wherein said second unit comprises three receiving antennas having respective effective axes that are oriented orthogonally relative to each other, and wherein said step c) is carried out by said three receiving antennas.

13. The method according to claim 12, wherein said three receiving antennas comprise an annular ring-shaped antenna extending on a plane and two rod-shaped antennas extending on said plane of said ring-shaped antenna.

14. The method according to claim 1, wherein said first and second actual field strength values are respective absolute magnitude values of a field strength of said first and second electromagnetic fields respectively.

15. The method according to claim 1, further comprising determining a reception angle between said first and second transmitting antennas from said actual field strength values, and comparing said reception angle with a prescribed angle to determine whether a correspondence exists therebetween.

16. The method according to claim 1, further comprising storing results of said comparing of said step e).

17. The method according to claim 1, wherein said actual field strength values are magnetic field strength values of respective magnetic portions of said first and second electromagnetic fields.

18. The method according to claim 1, further comprising carrying out a data transmission by modulating data onto at least one of said first and second electromagnetic signals.

19. The method according to claim 18, wherein said modulating comprises a phase modulation or a frequency modulation.

20. The method according to claim 18, wherein said steps a) to e) are carried out before or at a beginning of said data transmission.

21. The method according to claim 18, wherein said steps d) and e) are carried out repeatedly at intervals while carrying out said data transmission.

22. The method according to claim 1, wherein said step e) is carried out in said second unit.

23. The method according to claim 22, wherein said second unit further has a transmitting capability and said first unit further has a receiving capability, and further comprising transmitting a result of said comparing of said step e) from said second unit to said first unit.

24. The method according to claim 1, wherein said second unit further has a transmitting capability and said first unit further has a receiving capability, and further comprising transmitting said actual field strength values from said second unit to said first unit, and wherein said step e) is carried out in said first unit.

* * * * *